US008376089B2

(12) United States Patent
Stone

(10) Patent No.: US 8,376,089 B2
(45) Date of Patent: Feb. 19, 2013

(54) LIFT FOR SKIDS AND PALLETS

(75) Inventor: Robert M. Stone, Tucson, AZ (US)

(73) Assignee: Bishamon Industries Corporation, Ontario, CA (US)

(*) Notice: Subject to any disclaimer, the term of this patent is extended or adjusted under 35 U.S.C. 154(b) by 1168 days.

(21) Appl. No.: 12/002,135

(22) Filed: Dec. 14, 2007

(65) Prior Publication Data

US 2008/0164101 A1 Jul. 10, 2008

Related U.S. Application Data

(60) Provisional application No. 60/879,124, filed on Jan. 8, 2007.

(51) Int. Cl.

| | |
|---|---|
| ***B66F 9/06*** | (2006.01) |
| ***B66F 9/075*** | (2006.01) |
| ***B60P 1/02*** | (2006.01) |
| ***B62B 3/06*** | (2006.01) |

(52) U.S. Cl. ....... 187/232; 187/224; 187/231; 180/19.2; 414/495; 414/631; 280/43.12

(58) Field of Classification Search .................. 187/224, 187/231, 237, 232; 414/495, 631, 785; 180/19.1, 180/19.2, 65.2, 65.5; 108/57.17; 280/3, 280/43.12

See application file for complete search history.

(56) References Cited

U.S. PATENT DOCUMENTS

| | | | | |
|---|---|---|---|---|
| 3,265,158 | A * | 8/1966 | Constable | 187/232 |
| 3,567,240 | A | 3/1971 | Brassington | |
| 3,876,039 | A * | 4/1975 | Bushnell, Jr. | 187/226 |
| 3,957,137 | A * | 5/1976 | Vermette | 187/232 |
| 4,571,139 | A * | 2/1986 | Moseley et al. | 414/347 |
| 4,613,272 | A * | 9/1986 | vom Braucke et al. | 414/347 |
| 4,987,976 | A | 1/1991 | Daugherty | |
| 5,174,415 | A | 12/1992 | Neagle et al. | |
| 5,354,080 | A * | 10/1994 | Jones | 280/43.12 |
| 5,584,363 | A * | 12/1996 | Curtin et al. | 187/243 |
| 5,752,584 | A * | 5/1998 | Magoto et al. | 187/234 |

FOREIGN PATENT DOCUMENTS

DE 2846991 A1 * 8/1979

* cited by examiner

*Primary Examiner* — Michael Mansen
*Assistant Examiner* — Stefan Kruer
(74) *Attorney, Agent, or Firm* — Antonio R. Durando

(57) ABSTRACT

A lift has two tines that project forward and are movable up-and-down to raise and lower pallets and skids. Two outriggers are pivotal between a stored position and a deployed position, and the outriggers project forward in the deployed position to stabilize the lift when the tines are elevated. The lift combines the capabilities of pallet trucks, skid lifts and stackers in a highly maneuverable configuration

17 Claims, 17 Drawing Sheets

LIFT FOR SKIDS AND PALLETS

RELATED APPLICATIONS

The application is based on and claims priority of U.S. Provisional Application No. 60/879,124, filed Jan. 8, 2007.

BACKGROUND OF THE INVENTION

1. Field of the Invention

The invention relates to a lift for skids and pallets.

2. Description of the Prior Art

Skids and pallets provide a relatively flat and stable platform on which to stack loads for transport.

A skid consists of three parallel wooden beams running lengthwise of the skid and a series of parallel wooden boards running widthwise of the skid. Each of the beams has a lower edge on which the respective beam rests when the skid is on the ground, and each of the beams further has an upper edge to which the boards are secured. Neighboring boards are spaced from one another by a predetermined distance, and the boards cooperate to define a platform for a load. Neighboring ones of the beams are spaced from each other by a distance greater than that between the boards, and the beams define two passages running lengthwise of the skid.

Similarly to a skid, a pallet has three lengthwise beams as well as a series of boards that are located on the upper side of the pallet and define a platform for a load. However, in contrast to a skid, a pallet is provided with several boards also on the lower side thereof. These lower boards again run widthwise of the pallet, and one lower board is situated at either end of the pallet while one or more lower boards is disposed at or near the middle of the pallet. The lower boards rest on the ground when the pallet is set down. As in a skid, the beams of a pallet define two passages running lengthwise of the pallet, and such passages extend between the upper and lower boards.

A device capable of lifting and transporting both skids and pallets is the forklift. This is a motorized vehicle having a pair of spaced prongs or tines that project to the front of the vehicle and are movable up-and-down on a mast or column. To lift a skid or pallet, the prongs are aligned with and are inserted lengthwise in the passages of the skid or pallet. After the prongs have been inserted in the passages, the prongs are raised to lift the skid or pallet off the ground for transport. The range of motion of the prongs is sufficient to lift a skid or pallet to a so-called "work height," which is typically 30 inches.

Since forklifts are expensive, a cheaper alternative known as a manual stacker is frequently employed. As opposed to a forklift, a manual stacker is not motorized and is propelled manually. Similarly to a forklift, a stacker has a pair of spaced prongs or tines that project to the front of the stacker and are movable up-and-down on a mast or column. A stacker additionally has a pair of so-called outriggers projecting to the front of the stacker in the form of beams with wheels or casters at the forward ends thereof. The outriggers, which are spaced from each other widthwise of the stacker and prevent the stacker from tipping forward under the weight of a pallet carried by the prongs, are not required on a forklift because the motor that propels the forklift is rear-mounted and serves as a counterweight to the pallet supported by the prongs. Such a counterweight is lacking on the non-motorized stacker. Like the prongs of a forklift, the prongs of a stacker have a range of motion sufficient to lift a skid or pallet to the working height.

The distance between the prongs of a stacker is less than the width of a pallet in order to allow the prongs to enter lengthwise the passages of the pallet. On the other hand, the outriggers of a stacker are spaced from each other by a distance greater than the width of the pallet so that the pallet can fit between the outriggers. If the spacing between the outriggers were less than the width of the pallet to thereby allow the outriggers to enter the passages of the pallet lengthwise, the lower boards of the pallet would lie underneath the outriggers and prevent the prongs from lifting the pallet. This problem does not arise with skids that do not have lower boards. However, due to the large spacing between the outriggers of stackers, they are difficult to maneuver.

A manually propelled device structurally similar to a stacker is the skid lift. The main difference between a stacker and a skid lift is that the outriggers of a skid lift are spaced from one another by a much smaller distance than the outriggers of a stacker. Typically, the distance between the outriggers of a skid lift is about equal to the distance between the prongs of the skid lift. Consequently, the skid lift is considerably narrower and easier to maneuver than a stacker. However, a skid lift cannot be used for pallets because its outriggers enter the passages of the pallet lengthwise and thereby prevent the prongs of the skid lift from raising the pallet.

Another manually propelled device is the pallet truck or pallet jack which, unlike the skid lift, can be used for both pallets and skids. A pallet truck has a pair of prongs with wheels designed to enter the passages of a pallet or skid lengthwise. In order to raise the pallet or skid off the ground, the wheels of the prongs can be moved between retracted and extended positions. When the wheels are retracted, the prongs are in a lowered position and can enter the passages of the pallet or skid lengthwise. The wheels still contact the ground while retracted and, in the case of a pallet, roll over the lower boards of the pallet upon entering the passages of the pallet lengthwise. Once the prongs have been properly positioned lengthwise in the passages of the pallet or skid, the wheels are extended thereby raising the prongs and lifting the pallet or skid off the ground for transport.

Although pallet trucks are easy to maneuver and operate and are therefore quite popular, they are incapable of lifting a pallet or skid to a working height. Therefore, there is still a need for an improved manually operated device that allows both transport and lifting of a pallet or skid to a working height.

SUMMARY OF THE INVENTION

One aspect of the invention resides in a lift for pallets and skids. The lift comprises a carrier movable across an underlying surface on which the carrier rests and at least one lifting member movable up-and-down on the carrier between a first range of lowered positions and a second range of raised positions. The lift also comprises at least one support for the lifting member movable between a retracted position and an extended position. The support is designed to bear against the surface underlying the carrier and to hold the lifting member above the surface when the lifting member is in the range of lowered positions and the support is in its extended position. The support is additionally designed to be free of contact with the surface underlying the carrier when the lifting member is in the range of raised positions. The lift further comprises at least one stabilizing member for stabilizing the carrier when the lifting member is in the range of raised positions, and the stabilizing member is movable on the carrier between a stored position and a deployed position. The stabilizing member is arranged to contact the surface underlying the carrier when the lifting member is in the range of raised positions and the stabilizing member is in its deployed position.

Another aspect of the invention resides in a lifting method. The method comprises the steps of establishing contact between a lifting member and a load resting on an underlying surface, and displacing the load upward from the underlying surface to an elevated position using the lifting member. The displacing step includes extending a support mounted on the lifting member while the support bears against the underlying surface. The method further comprises the steps of contacting a stabilizing member with the underlying surface while the support bears against the underlying surface and removing the support from the underlying surface following the contacting step.

Additional features and advantages of the invention will be forthcoming from the following detailed description of certain specific embodiments when read in conjunction with the accompanying drawings.

DESCRIPTION OF THE PREFERRED EMBODIMENTS

Figure 1:
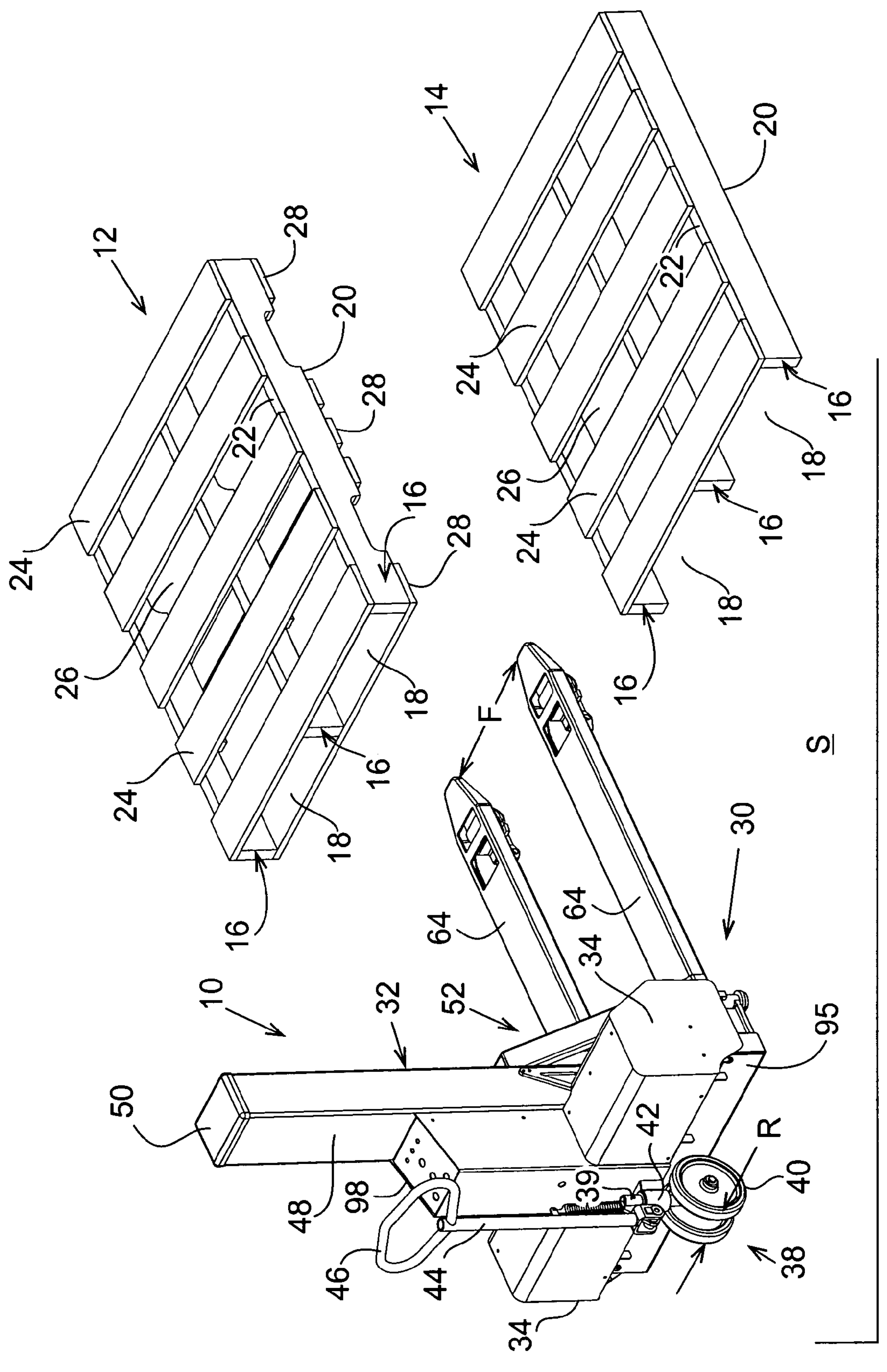
FIG. 1 is a perspective view of a lift according to the invention in condition for engaging a pallet or skid to be raised by the lift.
Figure 2:
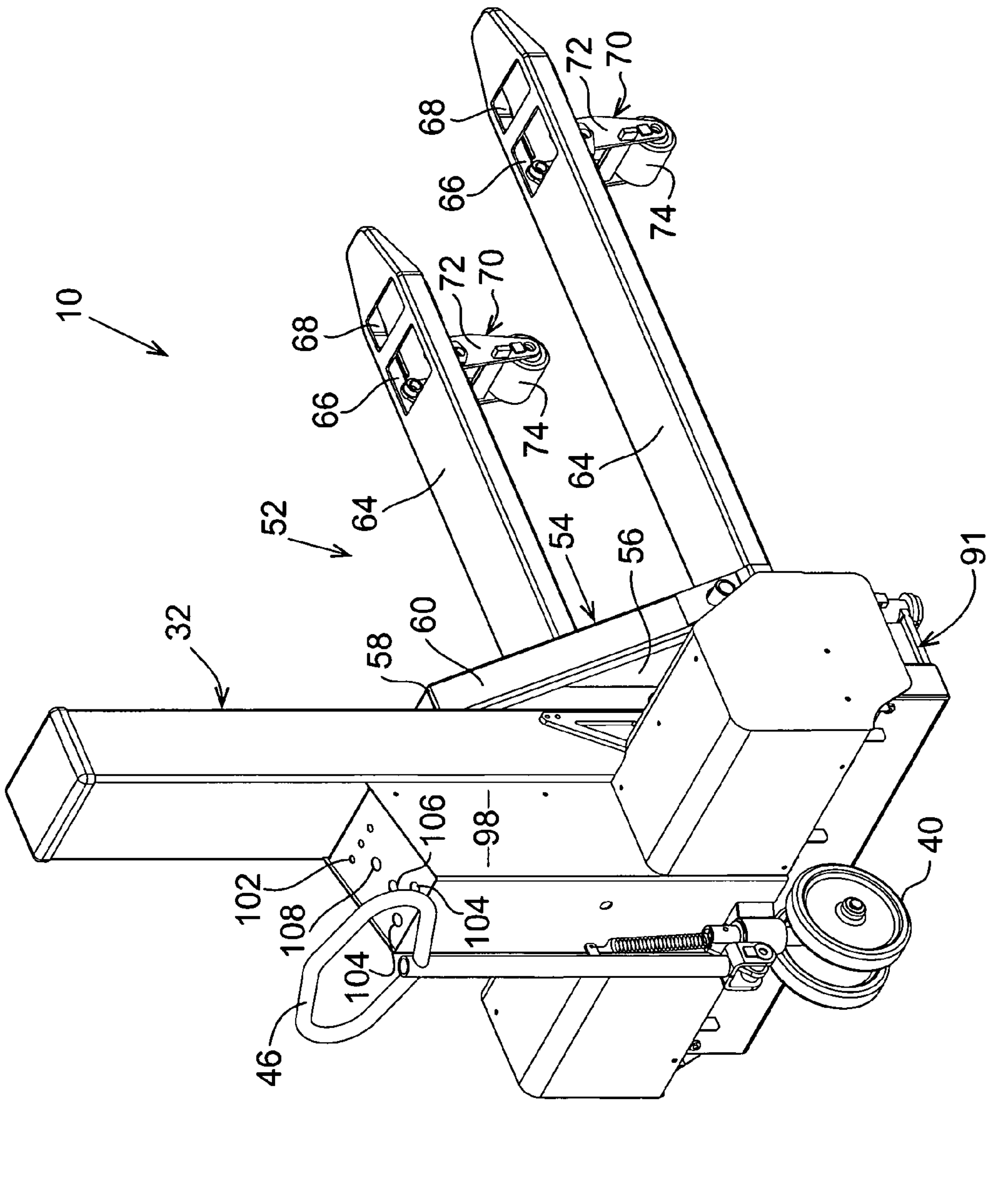
FIG. 2 is similar to FIG. 1, but shows the lift in condition for holding a pallet or skid at a first level above the surface.
Figure 3:
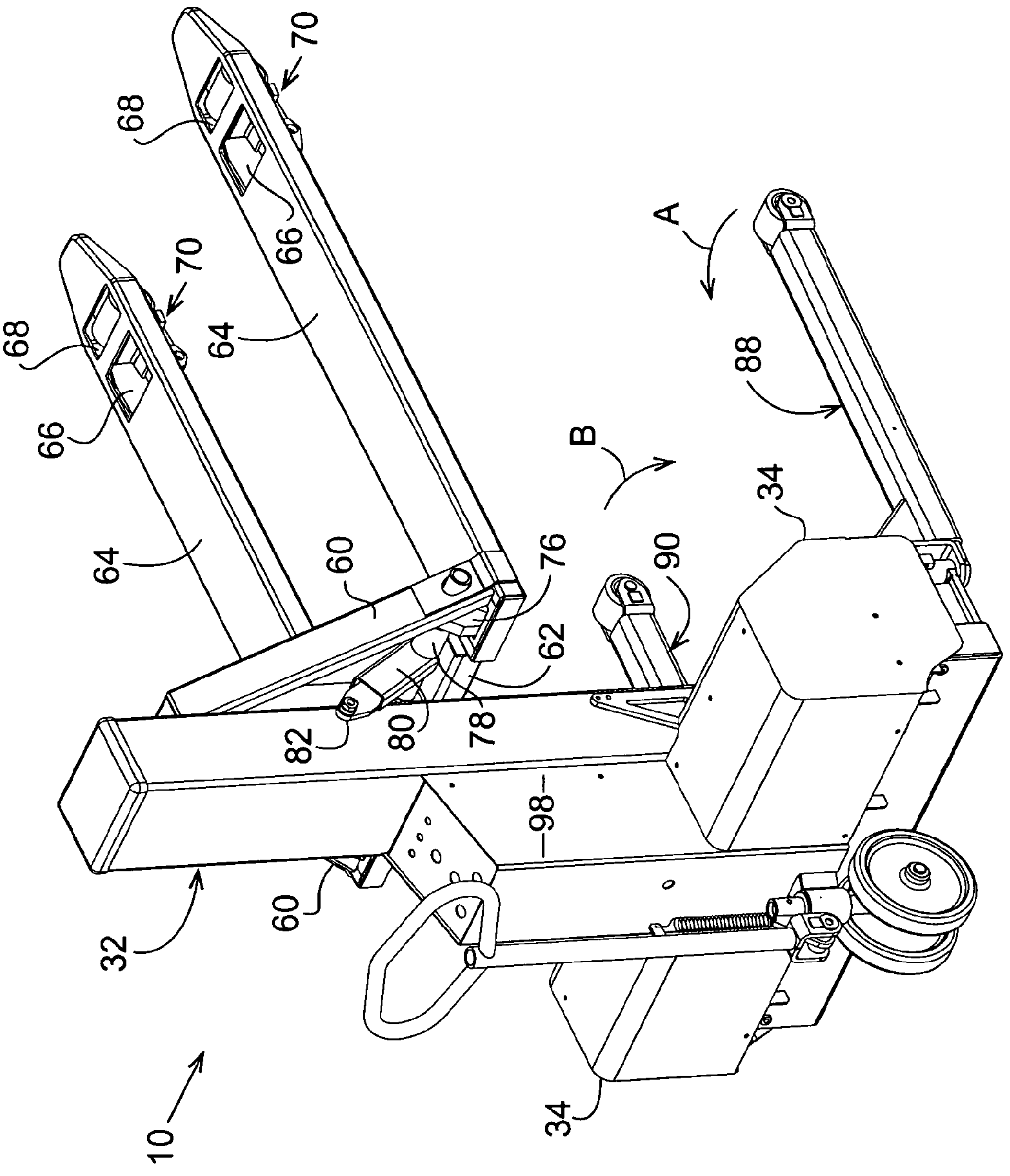
FIG. 3 is similar to FIG. 2, but shows the lift in condition for holding the pallet or skid at a higher second level above the surface.

Referring to FIGS. 1-3, the numeral 10 identifies a lift in accordance with the invention. The lift 10, which is manually propelled and lacks a motor or engine for propulsion, is designed to lift and transport a pallet 12 as well as a skid 14. The lift 10, pallet 12 and skid 14 rest on an underlying surface S, which is substantially horizontal.

Both the pallet 12 and the skid 14 typically comprise three parallel wooden beams 16 running lengthwise thereof. Neighboring beams 16 are spaced from one another and define passages 18 extending longitudinally of the pallet 12 and the skid 14. The pallet 12 and the skid 14 each have two passages 18. Each of the beams 16 has a lower surface 20 and an upper surface 22, and several parallel wooden boards 24 running widthwise of the pallet 12 and the skid 14 are secured to the upper surfaces 22 of the beams 16. Neighboring boards 24 are separated from one another by a gap 26, and the boards 24 cooperate to define a flat platform for a load L to rest on the pallet 12 or skid 14.

The pallet 12 additionally comprises a series of parallel wooden boards 28 that run widthwise of the pallet 12 and are directly secured to the lower surfaces 20 of the pallet beams 16. One board 28 is located at each end of the pallet 12 while at least one other board 28 is located in the middle of the pallet 12. The boards 28 contact the underlying surface S on which the pallet 12 rests and support the pallet 12 on the surface S.

In contrast to the pallet 12, the lower surfaces 20 of the skid beams 16 are free of direct attachment to boards or other objects. The lower surfaces 20 of the skid beams 16 contact the underlying surface S on which the skid 14 rests, and the beams 16 support the skid 14 on the surface S.

The lift 10 has a front F and a rear R and includes a carrier 30 that adjoins the rear R of the lift 10. The carrier 30 comprises a mast or supporting column 32 that internally is generally U-shaped in plan view (with the open end facing the front F), and the carrier 30 further comprises two compartments 34 that are secured to opposite sides of the mast 32. Each of the compartments 34 is in the form of an elongated box that accommodates operating components of the lift 10.

An outrigger assembly is mounted transversely below the compartments 34 to house a pair of extendable outriggers described in detail below. A frame rolling assembly 38 that includes rolling elements 40 such as wheels, rollers or casters, is mounted at the rear of the lift 10 in conventional manner. The frame rolling assembly is preferably the same as found in pallet jacks. The rolling assembly 38 includes a shaft or pin 39 rotatably mounted on a tube 42 that is rigidly attached to the rear of the lift. The rolling assembly further includes a bar 44 that is connected to the shaft 39 and is hinged for rearward movement over a vertical plane, so as to provide a convenient lever for pushing and pulling the lift 10 and for rotating the frame rolling assembly 38 as needed for transport of the lift in any direction. A handle 46, attached to the top of the bar 44, can be gripped by an operator of the lift 10 to manually propel and move the lift 10 across the underlying surface S.

Figure 4A:
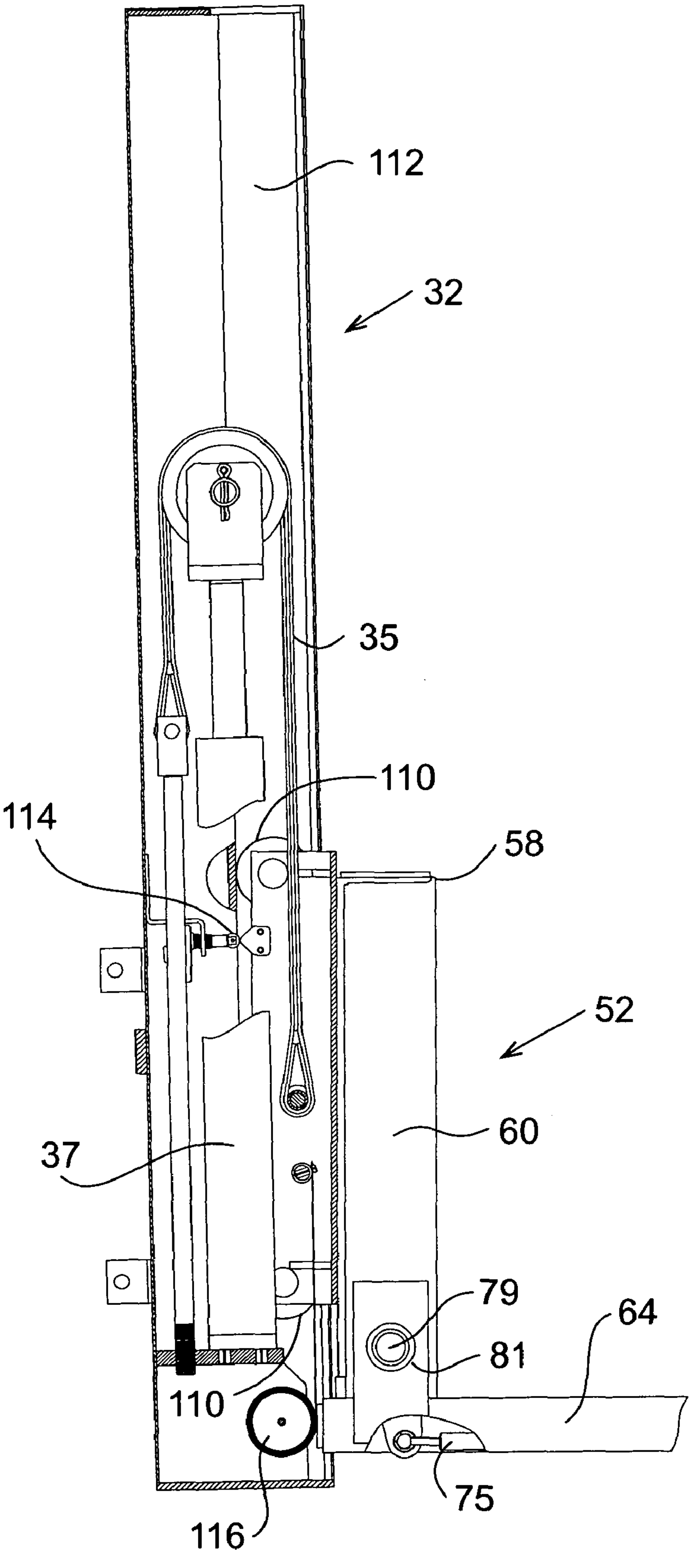
FIGS. 4A and 4B are partially cut-out elevational and plan views, respectively, of the mast of FIG. 1 showing a belt drive mounted in conventional manner in an open channel facing the front of the lift.
Figure 4B:
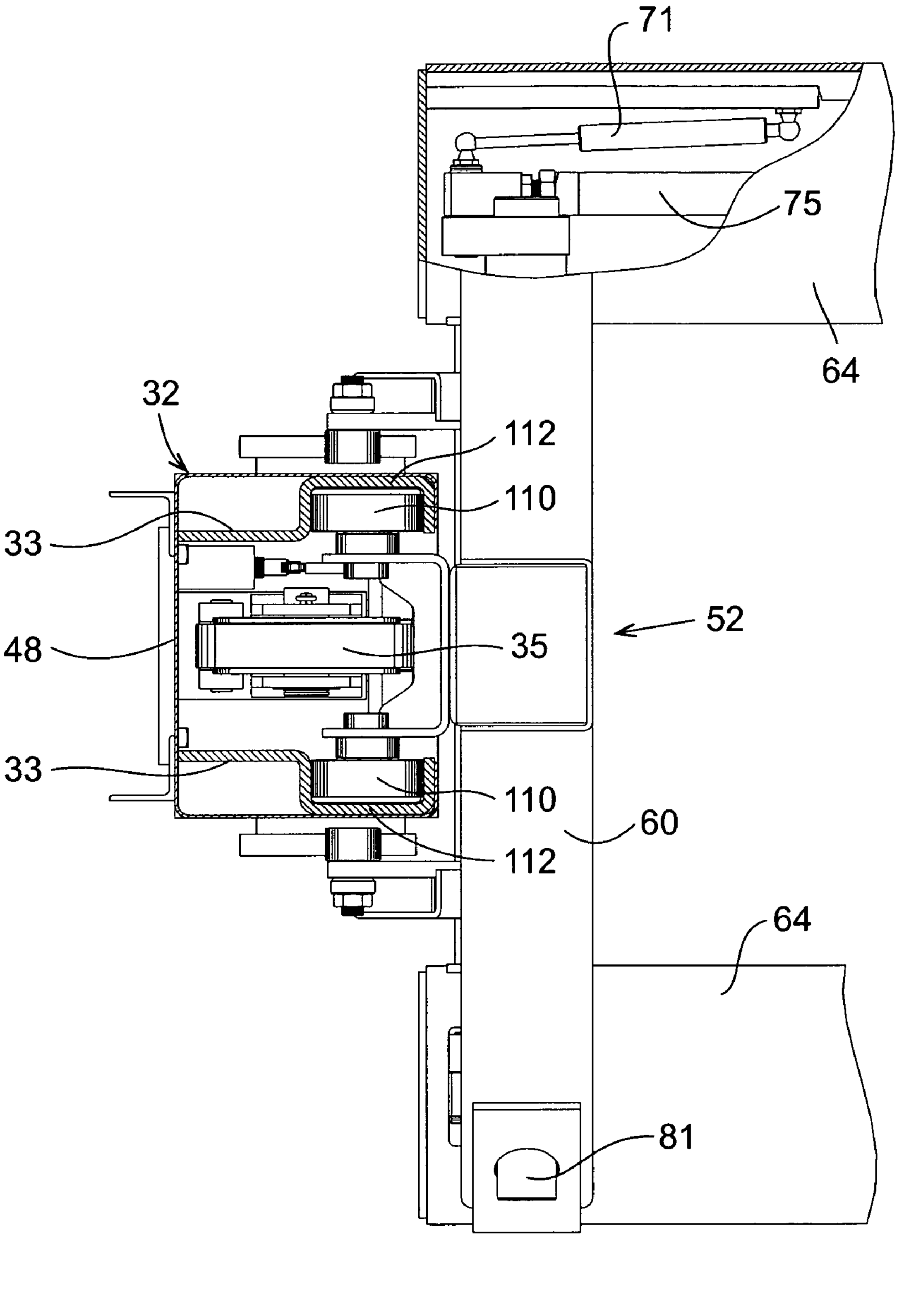

The mast 32 includes a pair of parallel vertical legs 33 (visible in the partially cut-out views of FIGS. 4A and 4B) that face the front F of the lift 10 and run lengthwise of the mast 32. The legs 32, which are spaced from one another widthwise of the lift 10, are joined to one another by a crosspiece 48 at the rear of the mast 32 and cooperate with the crosspiece 48 to define a lengthwise channel in the mast 32. As illustrated seen in FIGS. 4A and 4B, a chain or belt drive 35 is mounted on the mast 32 in this channel, and the drive is elongated and extends lengthwise of the mast 32. The upper end of the channel in the mast 32 is closed by a cover 50.

A carriage 52 is connected in conventional manner to the chain or belt drive 35. The carriage 52 is movable up-and-down along the mast 32 by the chain or belt drive 35 between a range of lowered positions and a range of raised positions. The carriage 52 comprises a generally triangular apron or carrying member 54 that includes a plate 56 (see FIG. 2) having opposed major surfaces facing the front F and the rear R of the lift 10, respectively.

The triangular plate section has an apex 58 and two side edges that diverge from such apex towards the lower edge of the apron. A bearing arm 60 extends along each of these two side edges and are mounted on the rearward facing major surface of the plate 56 and project from such surface towards the rear R of the lift 10. The bearing arms 60 meet at an apex directly behind the apex 58 of the triangular plate section.

A mounting arm 62 (see FIG. 3) runs along the lower edge of the plate 56 Similarly to the bearing arms 60, the mounting arm 62 is disposed on the rearward facing surface of the plate 56 and projects from this surface towards the rear R of the lift 10. The mounting arm 62 can, for example, be in the form of a rectangular tube.

The apron 54 is positioned so that the apex 58 of the triangular plate section and the apex of the bearing arms 60 are at the top of the apron 54 while the mounting arm 62 is at the bottom of the apron 54. The apron 54 is connected to the chain or belt drive 35 in the mast 32.

Two forks or tines 64 constituting elongated lifting members are mounted on the apron 54 and are designed to lift the pallet 12 or the skid 14 from the underlying surface S. Each of the lifting members 64 has a rearward end and a forward end, and the rearward ends of the lifting members 64 are at least partially received in respective rectangular open spaces on either side of the mounting arm 62. The rearward ends of the lifting members 64 are secured to the apron 54, to the bearing arms 60, and to the mounting arm 62. The lifting members 64 extend from the apron 54 towards the front F of the lift 10, and the forward ends of the lifting members 64 are located at the front F of the lift 10. Each of the lifting members 64 is provided with a pair of cutouts 66 and 68 in the region of the forward end thereof, and a carriage rolling assembly or support 70 is mounted on each of the lifting members 64 adjacent to the cutouts 66,68. The carriage rolling assembly of each lifting member 64 includes a holder 72 for a rolling element 74 such as a wheel, roller or caster (see FIG. 2).

Each carriage rolling assembly 70 is pivotal on the respective lifting member 64 between a retracted position shown in FIGS. 1 and 3 and an extended position shown in FIG. 2. The rolling elements 74 of the rolling assemblies 70 are in contact with, and support the lifting members 64 for rolling movement across, the underlying surface S in the extended positions as well as the retracted positions of the rolling assemblies 70. As shown in the partially cut-out view of FIG. 5, a push rod 75 extending through each of the lifting members 64 lengthwise thereof serves to move the rolling assemblies 70 between the retracted positions and the extended positions. Each of the carriage rolling assemblies 70 is continuously biased towards the retracted position by a gas spring 71, shown in FIG. 4B, or other biasing member acting on the push rod 75 disposed in the respective lifting member 64.

The push rods 75 that move the rolling assemblies 70 between the retracted positions and the extended positions are driven by respective actuating arms 76 (also seen in FIG. 3) located in the regions of the rearward ends of the lifting members 64. Each of the actuating arms 76 is fast with a tubular shaft 78 (see FIG. 3) of circular cross section that is rotatably mounted on a pin 79 supported at the center of the apron 54 and by at a respective arm 60 via a support sleeve 81. As seen particularly in the enlarged portion of FIG. 5, the shaft 78 constitutes a pivot and carries a lever arm 80 having two ends. One end of the lever arm 80 is fast with the shaft 78 and the other end of the lever arm 80 is provided with a cam follower 82. The cam follower 82 is arranged to track a cam 84 mounted on each side of the mast 32 and causes the follower 82 to urge the carriage rolling assemblies 70 from the retracted positions to the extended positions against the action of the gas springs 71 biasing the rolling assemblies 70 towards the retracted positions. A cam follower 82 and a cam 84 are situated on each side of the mast 32 with the cams 84 being disposed toward the upper part of the compartments 34.

The cam follower 82 acts on the carriage rolling assemblies 70 of the lifting members 64 via the lever arm 80, the pivoting shaft 78, the actuating arms 76 and the push rods 75 in each lifting member 64.

The lift 10 further includes a pair of outriggers or stabilizing members 88 and 90 (visible in FIG. 3). Each of the outriggers 88,90 is part of an outrigger assembly 91 mounted below the mast 32 (see FIG. 5). The outriggers 88,90 are pivotal on the carrier 30 between a stored position as in FIGS. 1 and 2 and a deployed position as in FIG. 3. FIGS. 6-10 detail the outrigger assembly 91 shown in isolation to illustrate its structural configuration and operation. In the stored positions, seen in the elevational view of FIG. 6 and the plan view of FIG. 7, the outriggers 88,90 are disposed next to and to the front of the carrier 30. In their deployed positions, the outriggers 88,90 project from the carrier 30 towards the front F of the lift 10, as seen in FIG. 3. As shown with more particularity in FIGS. 8-10, each of the outriggers 88,90 comprises a bar or elongated supporting member 92 having an end 93 that is remote from the carrier 30 in the deployed position of the respective outrigger 88,90. The end 93 of each outrigger 88,90 is fast with a holder 94 for a rolling element 96 such as a wheel, roller or caster.

Figure 9:
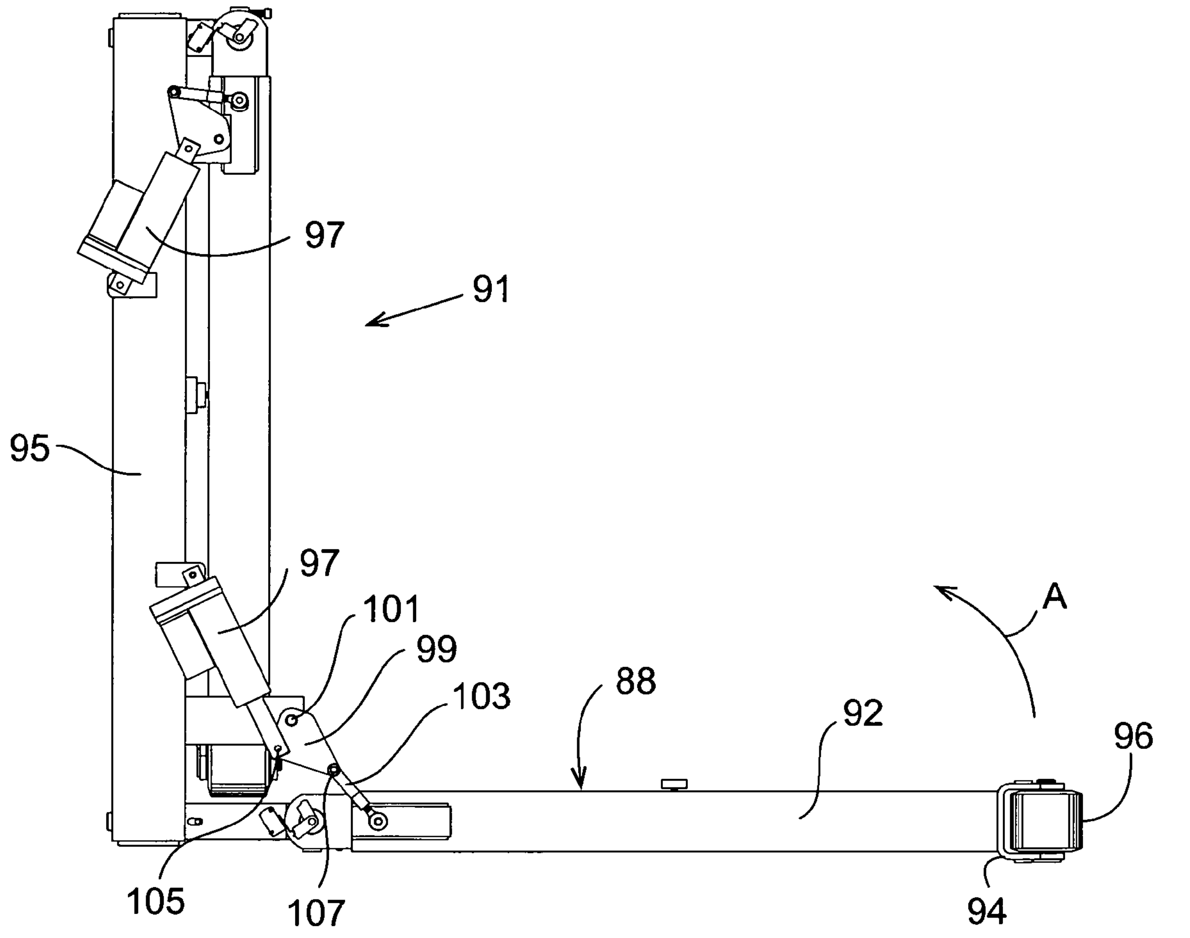
FIG. 9 is a plan view of the outrigger assembly in the condition of FIG. 8.
Figure 10:
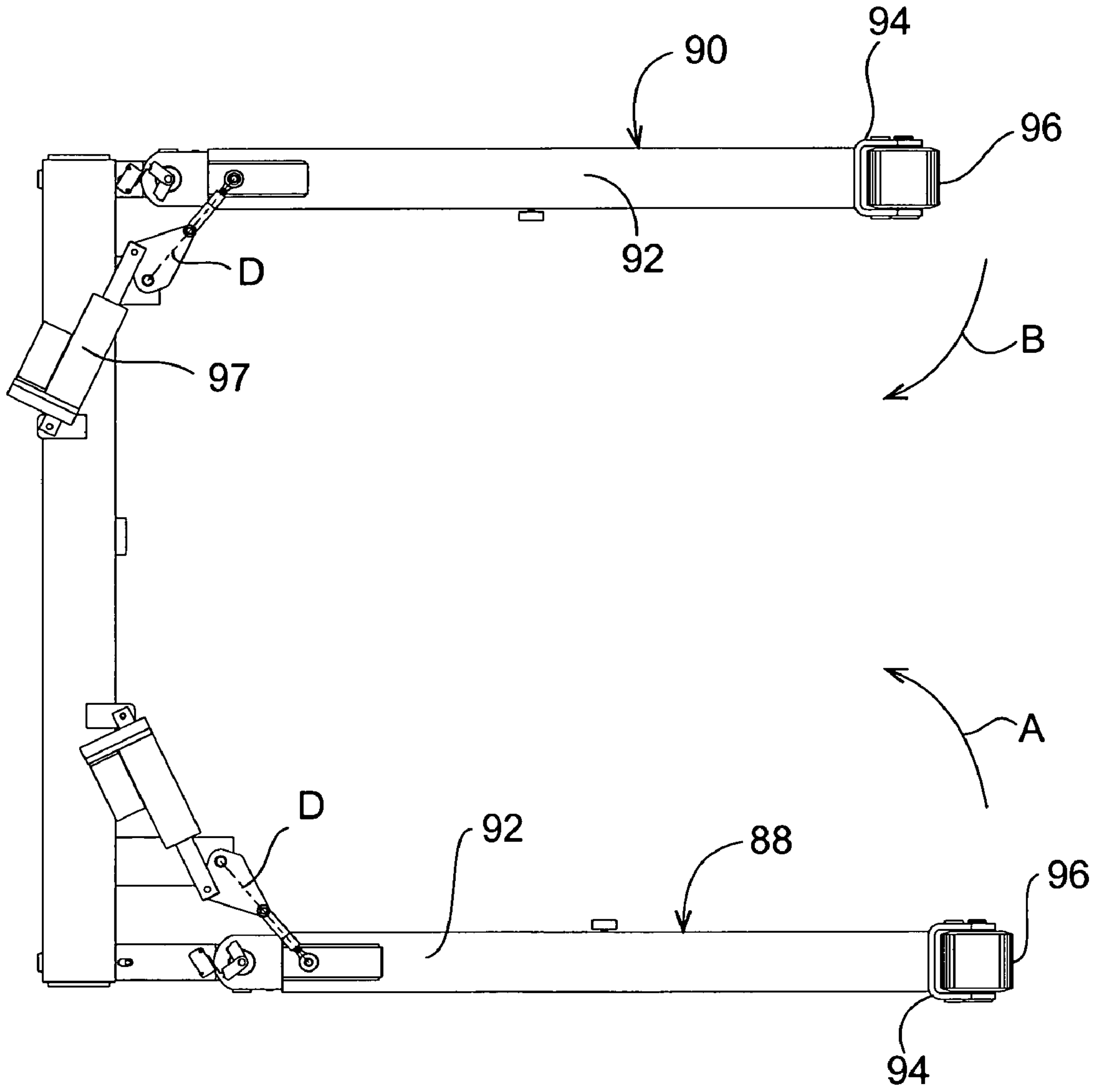
FIG. 10 is a plan view of the outrigger assembly of FIGS. 6 and 7 illustrating both outriggers in extended position.

The outrigger 88 pivots from the deployed position (FIGS. 8-10) to the stored position (FIGS. 6 and 7) in a direction indicated by the arrow A in FIGS. 3 and 9, while the outrigger 90 pivots from the deployed position (FIG. 10) to the stored position (FIGS. 6 and 7) in a direction indicated by the arrow B. The outrigger assembly 91 is positioned below and partly to the rear of the mast 32 and is structurally connected to the mast through a support frame 95. Each outrigger 88,90 is actuated by a linkage mechanism driven by an electric actuator 97 that is hinged to the frame 95 and connected to a plate 99 that is also pivotally attached to the frame 95 through a pivot axle 101. The plate 99 is further connected to the supporting member 92 by means of an extension rod 103. Both hinged connections 105 and 107 of the actuator 97 and rod 103, respectively, to the plate 99 are rotatable, thereby creating two lever arms through which the action of the actuator 97 is propagated to the supporting member 92. As illustrated in FIG. 10, the various points of connection in the linkage mechanism between the frame 95 and the supporting member 92 are advantageously selected so as to be substantially aligned, as indicated by the dash lines D in the figure. This configuration provides maximum strength against lateral forces tending to push inward the outriggers 88,90 from their deployed position, such as when in operation the outriggers bump against obstacles or the like.

Figure 11:
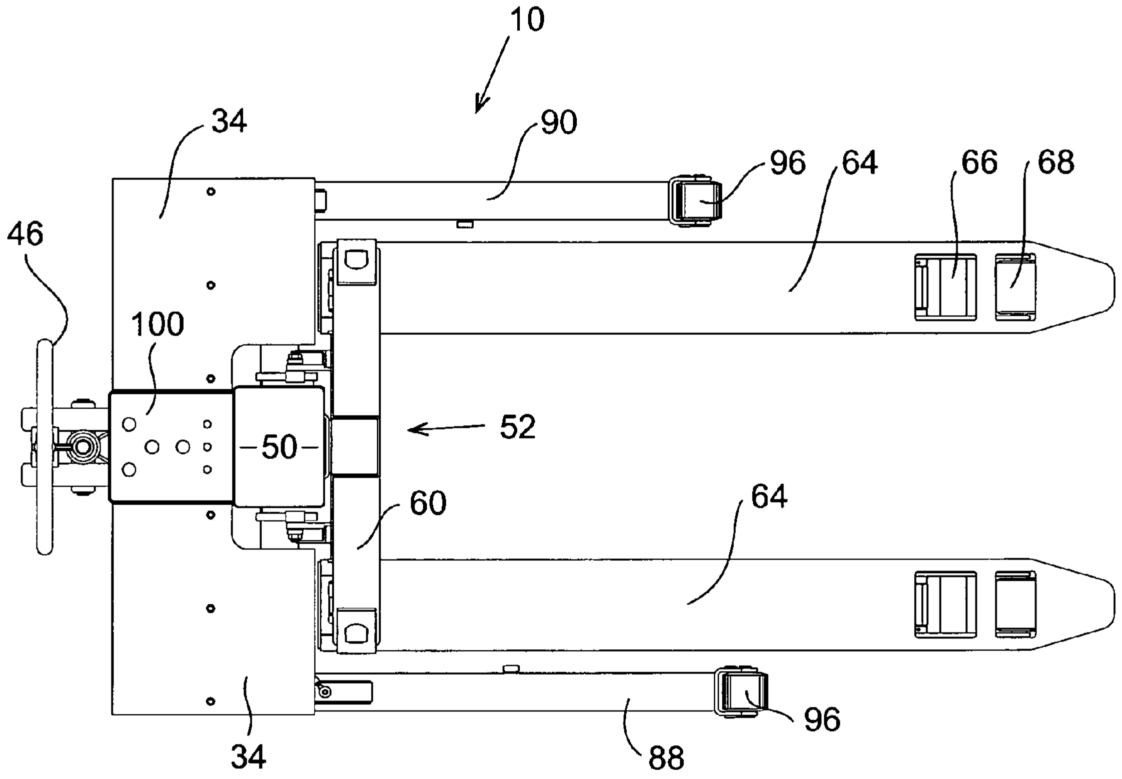
FIG. 11 is a plan view of the lift of the invention with both outriggers in extended position.

It is also advantageous for the outriggers 88,90 to be spaced from one another by a distance equal to or less than the width of the pallet 12 when the outriggers 88,90 are in their deployed positions. Preferably, the spacing between the outriggers 88,90 in the deployed positions is at most about 40 inches. A spacing of the outriggers 88,90 that does not exceed, or does not substantially exceed, the width of the pallet 12, as illustrated in the plan view of FIG. 11, allows the lift 10 to be easily maneuverable when the outriggers 88,90 are deployed.

Figures 5, 5A:
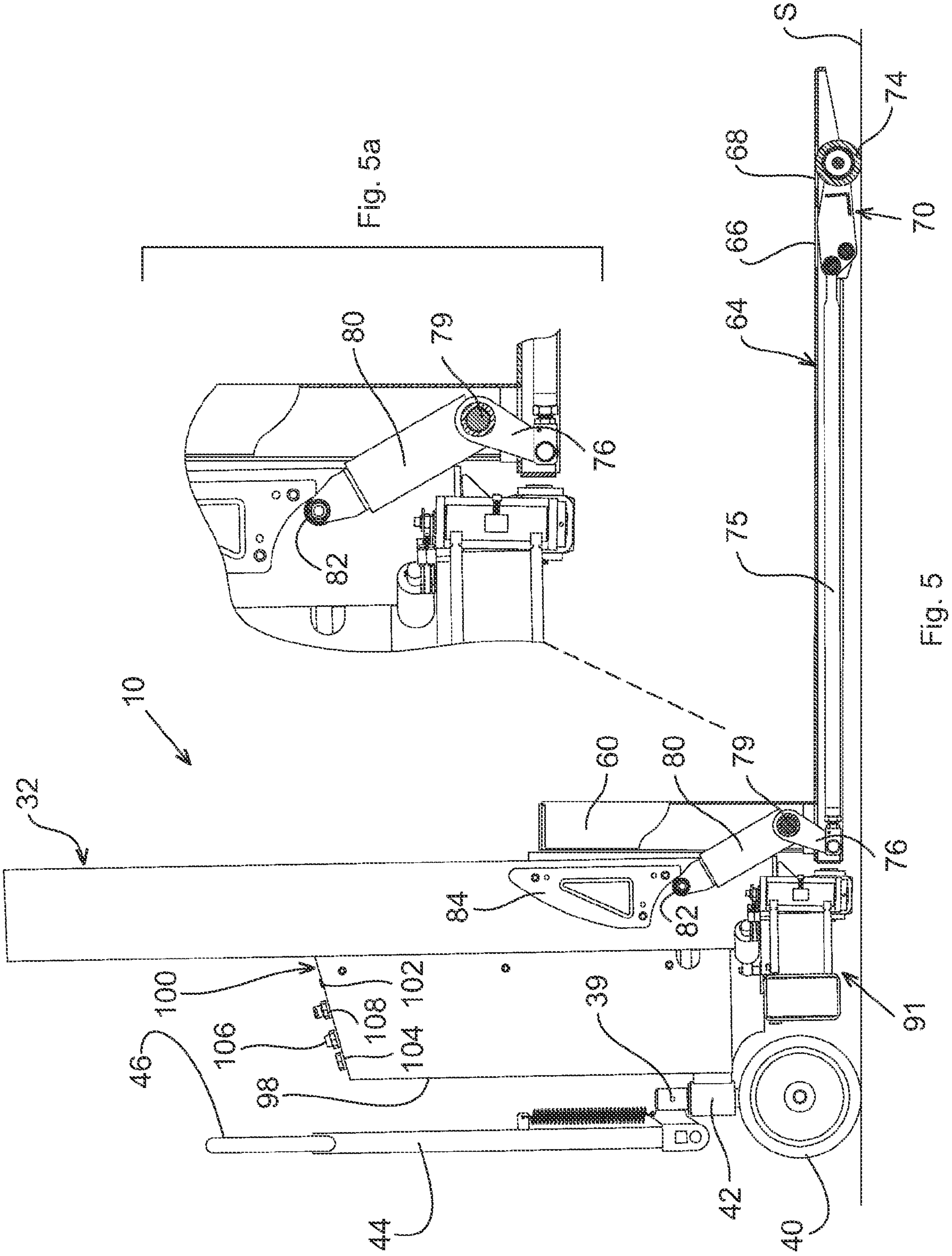
FIG. 5 is a partially cut-out elevational view of the lift of FIG. 1 showing the cam mechanism acting on each fork for extending and retracting the rolling assembly pivotally mounted at the front of the fork, an enlarged portion thereof being illustrated in FIG. 5*a*.
Figure 6:
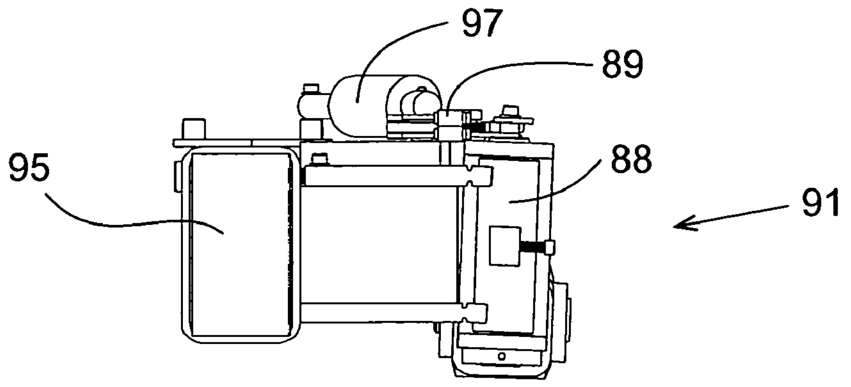
FIG. 6 shows in side elevational view the outrigger assembly of the invention in retracted position as it would appear in isolation from the rest of the lift.

The chain or belt drive 35 that moves the carriage 52 up-and-down is preferably driven in conventional manner by a hydraulic cylinder 37 (FIG. 4A) powered by a hydraulic pump (not shown) housed in a cabinet 98 on the rear of the mast 32 (see FIG. 5). The compartments 34 accommodate a battery for powering the hydraulic pump and a programmable logic controller (PLC) for supervising the operation of the carriage 52. The cabinet 98 includes a console 100 that is disposed at the top of the cabinet 98 and is provided with a set of fuses 102, up and down switches 104, an operational mode selection (pallet or stacker) switch 106, and a keyhole 108 for an ignition key. The key serves to turn the lift 10 on and off. One switch 104 causes the carriage 52 to move up, the other switch 104 causes the carriage 52 to move down, and the switch 106 functions to convert the lift 10 from one mode of operation to another.

Figure 12:
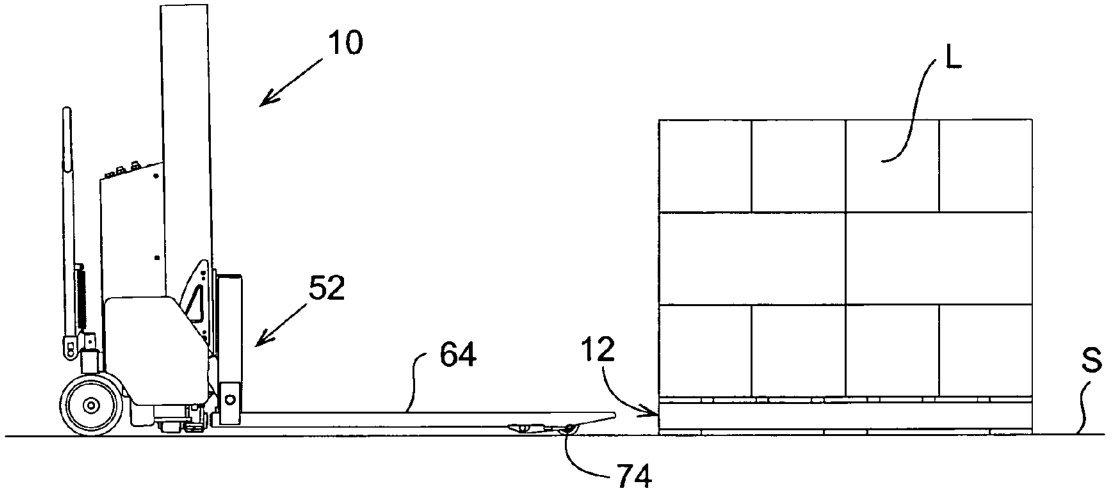
FIG. 12 shows the lift of the invention in elevational view with its carriage in its lowest position for engaging a pallet with a load.
Figure 13:
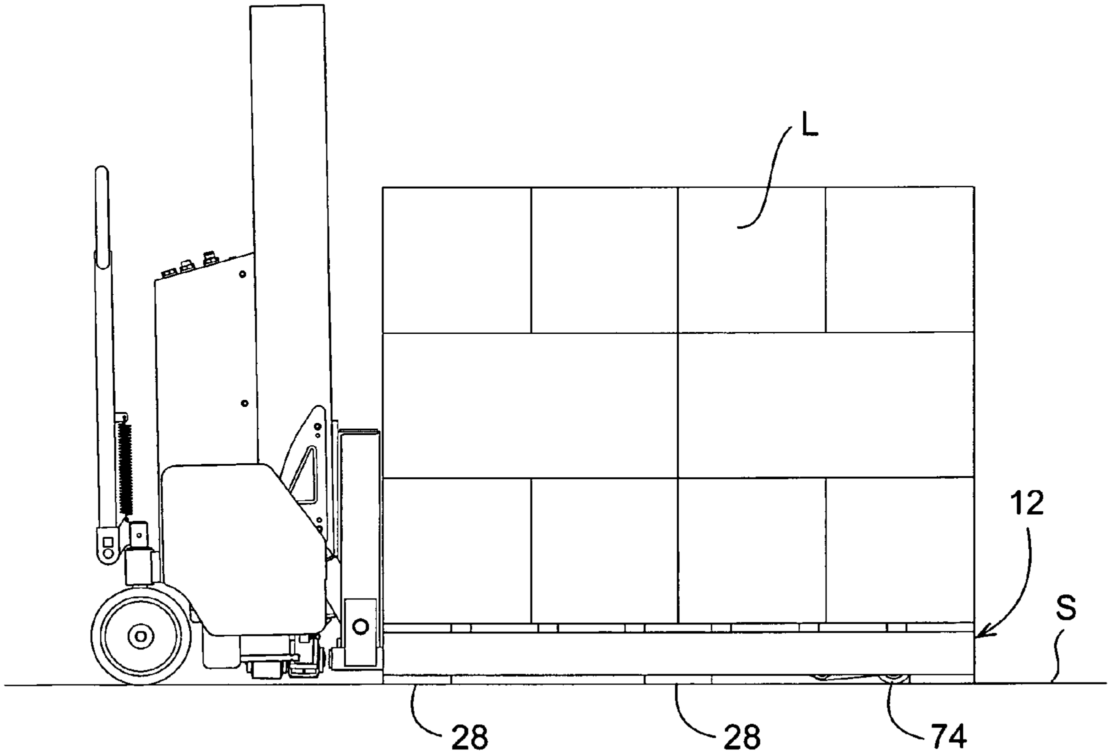
FIG. 13 shows the lift of FIG. 12 after the forks of the carriage have been inserted through the openings of the pallet.

As mentioned earlier, the carriage 52 is movable up-and-down along the mast 32 between a range of lowered positions and a range of raised positions. The motion of the carriage is guided by two rollers 110 riding respective vertical channels 112 formed in the front portions of the legs 33 of the mast 32. The range of lowered positions includes a lowermost position of the carriage 52, seen in FIG. 1. In this lowermost position of the carriage 52, the heights of the lifting members 64 above the underlying surface S are such that the lifting members 64 can enter lengthwise the passages 18 of a pallet 12 or a skid 14 resting on the surface S, as illustrated in FIGS. 12 and 13. The lifting members 64 are arranged so that, when the lifting members 64 are inserted in the passages 18 of the pallet 12 or skid 14, the two lifting members 64 are located in different ones of the passages 18.

It was indicated previously that the pallet 12 has boards 28 that rest on the underlying surface S and that one board 28 is located at each end of the pallet 12 while at least one board 28 is located in the middle of the pallet 12. When the lifting members 64 are inserted in the passages 18 of the pallet 12, the lifting members 64 enter the passages 18 at one end of the pallet 12. The rolling elements 74 of the lifting members 64 roll over the board 28 at such end of the pallet 12 and over the board or boards 28 in the middle of the pallet 12, thereby causing the lift 10 to experience bumps or jolts that are easily absorbed while the pallet is not yet engaged and the weight of the load L on the pallet is not yet supported by the lifting members 64. For optimal stability, the lifting members are also preferably designed in such a manner that, when they are fully inserted in the passages 18 of the pallet 12, the rolling elements 74 are just short of the board 28 located at the end of the pallet 12 opposite that where the lifting members 64 entered the passages 18.

As noted above, the carriage rolling assemblies 70 of the lifting members 64 are biased towards their retracted positions by the gas springs 71 and the cam follower 82 serves to cause movement of the rolling assemblies 70 from their retracted positions to their extended positions against the action of the gas springs. In the lowermost position of the carriage 52, the cam follower 82 exerts no force on the rolling assemblies 70, which therefore are in their retracted positions due to the biasing action of the gas springs, as seen clearly in FIG. 5. The rolling elements 74 of the rolling assemblies 70 nonetheless bear on the underlying surface S in the retracted positions to support the lifting members 64 for rolling movement across the surface S.

When the carriage 52 is in its lowermost position, the outriggers 88,90 are in their stored positions, as illustrated in FIGS. 1, 5 and 12, for example. Assuming that the lifting members 64 have been inserted lengthwise in the passages 18 of a pallet 12 (or skid 14), as illustrated in FIG. 13, one mode of operation of the lift 10 is as follows.

An operator turns on the lift 10 with a key and actuates the up switch 104 on the console 100, thereby causing the carriage 52 to begin ascending from its lowermost position. The rising rate of the rear of the fork carriage 52 is set by the rate of the hydraulic cylinder extension. In essence, the rising rate of the front of the forks is set by the profile of the cam. As the carriage 52 starts to rise, the cam follower 82 begins to track the cam 84 and urges the carriage rolling assemblies 70 of the lifting members 64 from the retracted position to the extended position illustrated in FIG. 14. The arrangement is such that, during movement of the rolling assemblies 70 to the extended positions, the forward ends of the lifting members 64, pushed upward by the extending motion of the roller assemblies, ascend slightly more rapidly than the rearward ends of the lifting members 64 and the carriage 52 connected thereto. Consequently, the lift 10 tilts backwards slightly on the rolling elements 40 as the rolling assemblies 70 extend. The tilt angle need not be great and can, for example, be of the order of 1 to 1.5 degrees. As the rolling assemblies 70 move from the retracted positions to the extended positions, the pallet 12 or skid 14 is engaged and lifted from the underlying surface S, as shown in FIG. 15.

Figure 14:
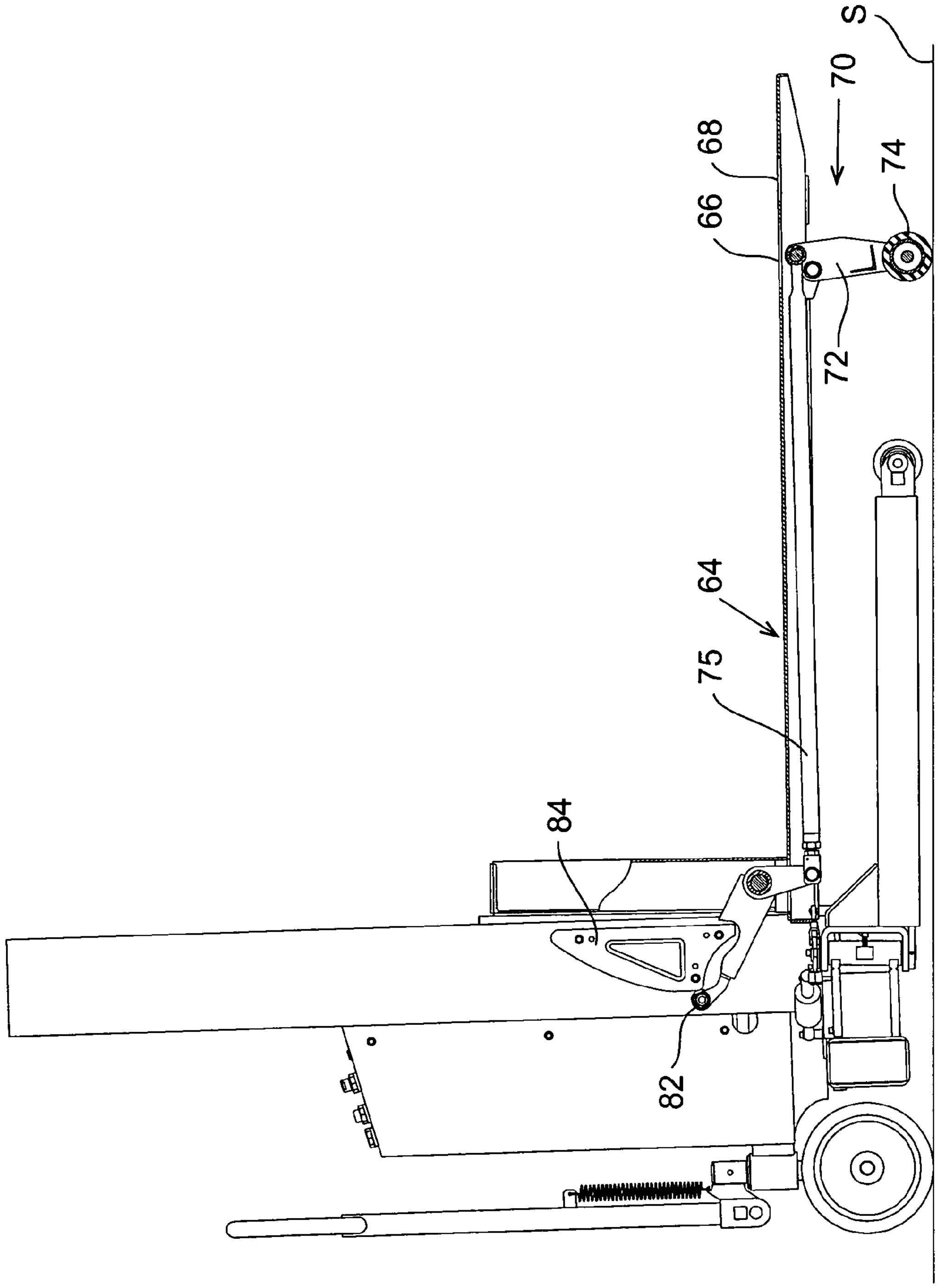
FIG. 14 is the same view of the lift of FIG. 5 after the cam mechanism has fully lowered the rolling assembly in each fork and the outriggers have been extended.
Figure 15:
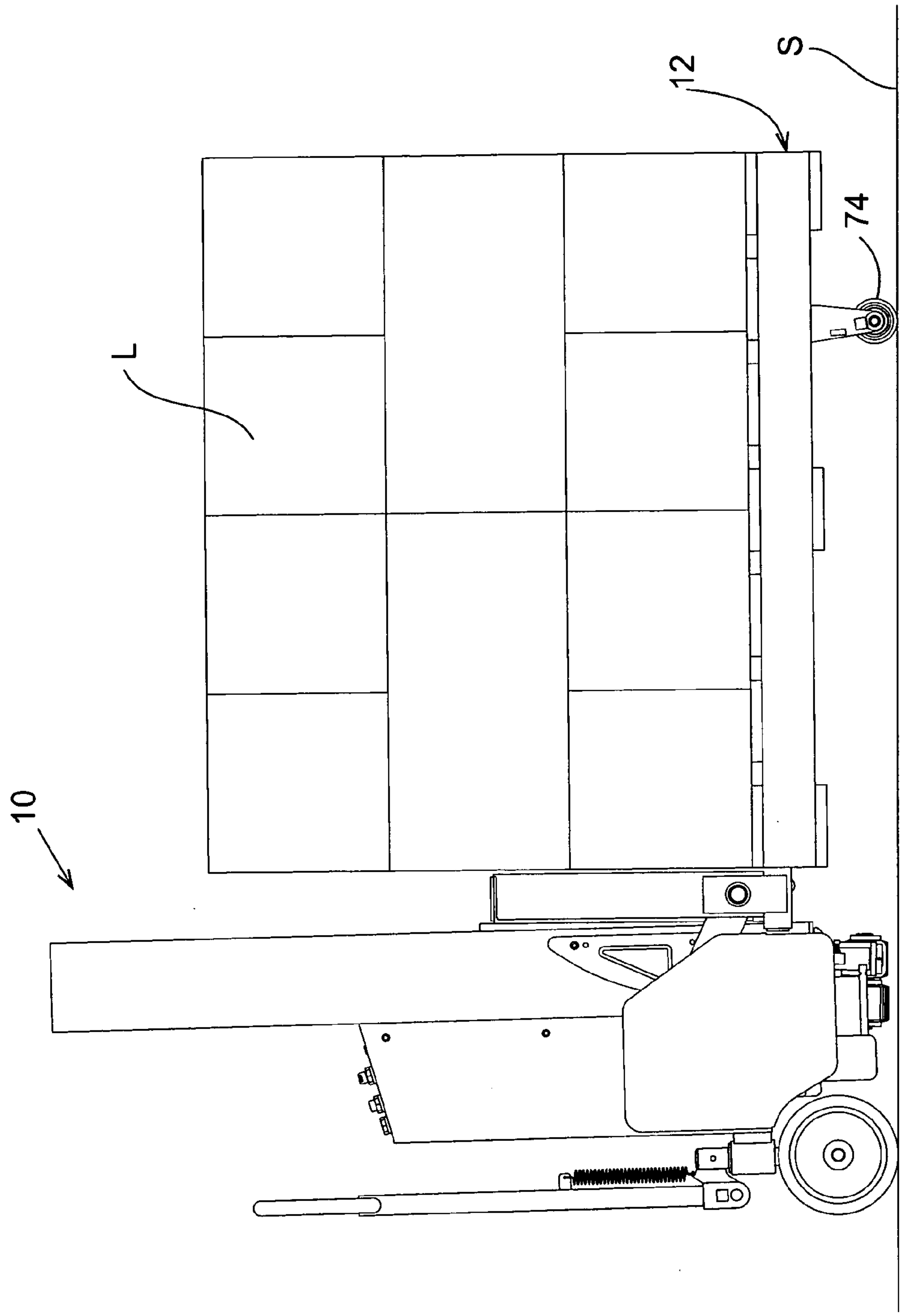
FIG. 15 shows the lift of the invention with a loaded pallet in position for extending the outriggers.

When the rolling assemblies 70 first reach their fully extended positions, corresponding to the cam/follower condition illustrated in FIG. 14 (a transition point between the range of lower positions and the range of raised positions of the carriage 52), the rolling elements 74 of the rolling assemblies 70 still rest on the underlying surface S and the lifting members 64 are inclined slightly upward toward the front of the lift. This provides stability to the pallet as the lifting members engage it and prevents shifting of the load L away from the lift. When the rolling assemblies 70 arrive at their extended positions, a limit switch 114 (see FIG. 4A) causes the carriage 52 to stop. At this time, the carriage 52 is at the top of the range of lowered positions, and the carriage remains there as long as the rolling elements 74 of the lifting members 64 are in contact with the underlying surface S. When the carriage 52 is moved upward from there, it transitions to the range of raised positions where the rolling elements 74 no longer contact the surface S.

Figure 7:
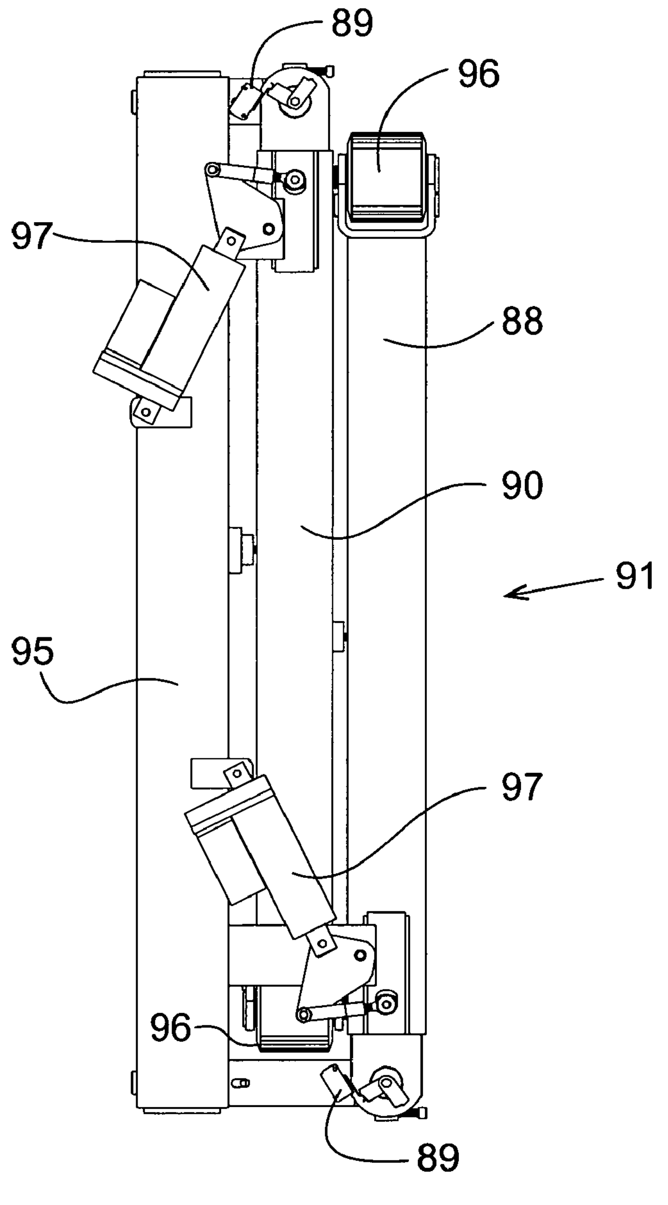
FIG. 7 is a plan view of the outrigger assembly of FIG. 6.
Figure 8:
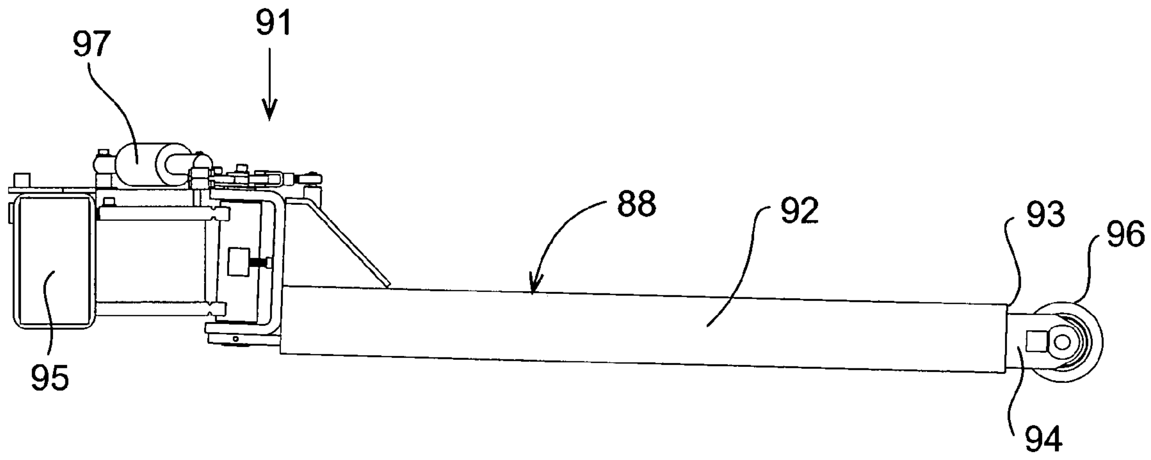
FIG. 8 is a side elevational view of the outrigger assembly of FIG. 6 with the right outrigger in extended position.
Figure 16:
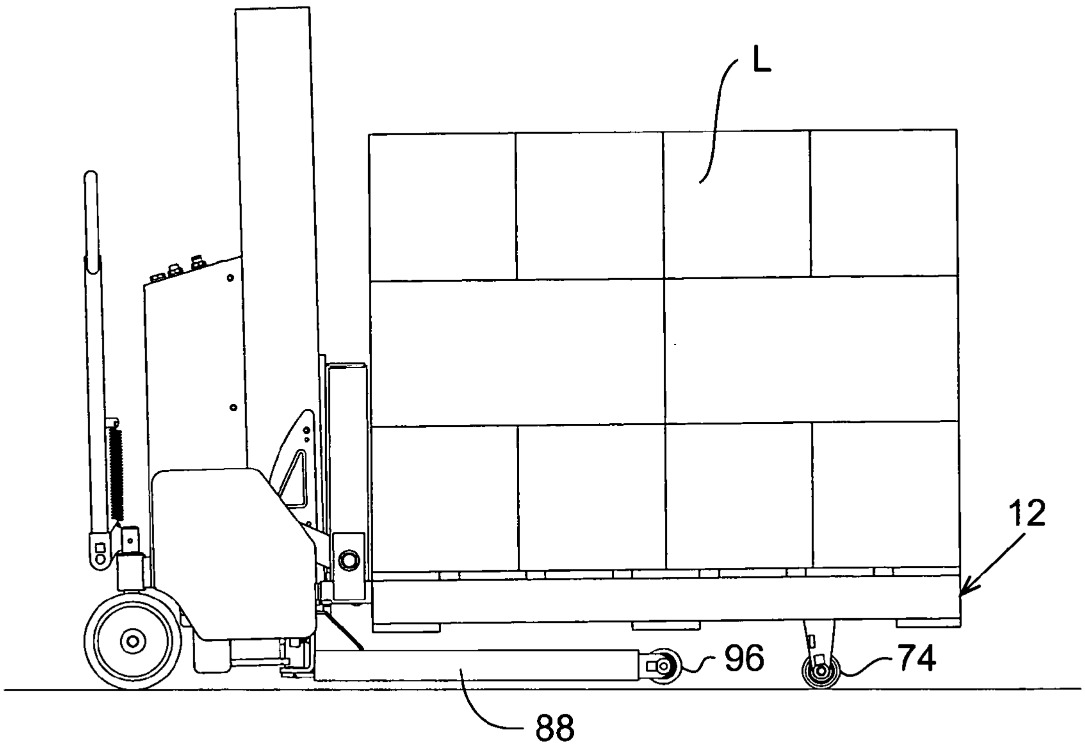
FIG. 16 shows the lift of the invention with a loaded pallet after the outriggers have been extended but have yet to bear on the supporting surface.

The height of each lifting member 64 above the underlying surface S is such that the outriggers 88,90 can pivot underneath the pallet or skid and the lifting members 64 without interference, as seen in FIG. 16. By way of example, the lift 10 can be designed so that the outriggers 88,90 can pivot below the pallet 12 or skid 14 when the lifting members 64 are located at a height of about 8 inches above the underlying surface S. Furthermore, in order to allow the outriggers 88,90 to swing freely beneath the pallet 12 or skid 14, the lengths of the outriggers 88,90 are smaller than the distances between the carrier 30 and the rolling elements 74 of the lifting members 64. Thus, after the carriage 52 comes to a stop, the right outrigger 88 first pivots from the stored position (as seen in FIG. 7, for example) to the deployed position (FIG. 9), followed by a similar deployment of the left outrigger 90 (FIG. 10). Limit switches 89, visible in FIGS. 6 and 7, sense the arrival of the outriggers 88 and 90 at their deployed position. Because of the short-stroke linkage system (2 inch with a 24 VDC actuator) adopted to move the outriggers, each can be deployed to full extension in about three seconds. The outriggers first move rapidly from their stored position and then slow down as they approach the full 90-degree rotation. The outriggers 88,90 remain clear of the underlying surface S during movement from the stored positions to the deployed positions and also upon arrival at the deployed positions (note the slight clearance between the surface S and the roller 96 of the outrigger 88 in FIG. 16). However, the heights of the outriggers 88,90 above the underlying surface S in the deployed positions need not be large. For instance, each of the outriggers 88,90 can be configured so that the roller 96 is about 0.50 inch above the underlying surface S in the deployed position.

Figure 17:
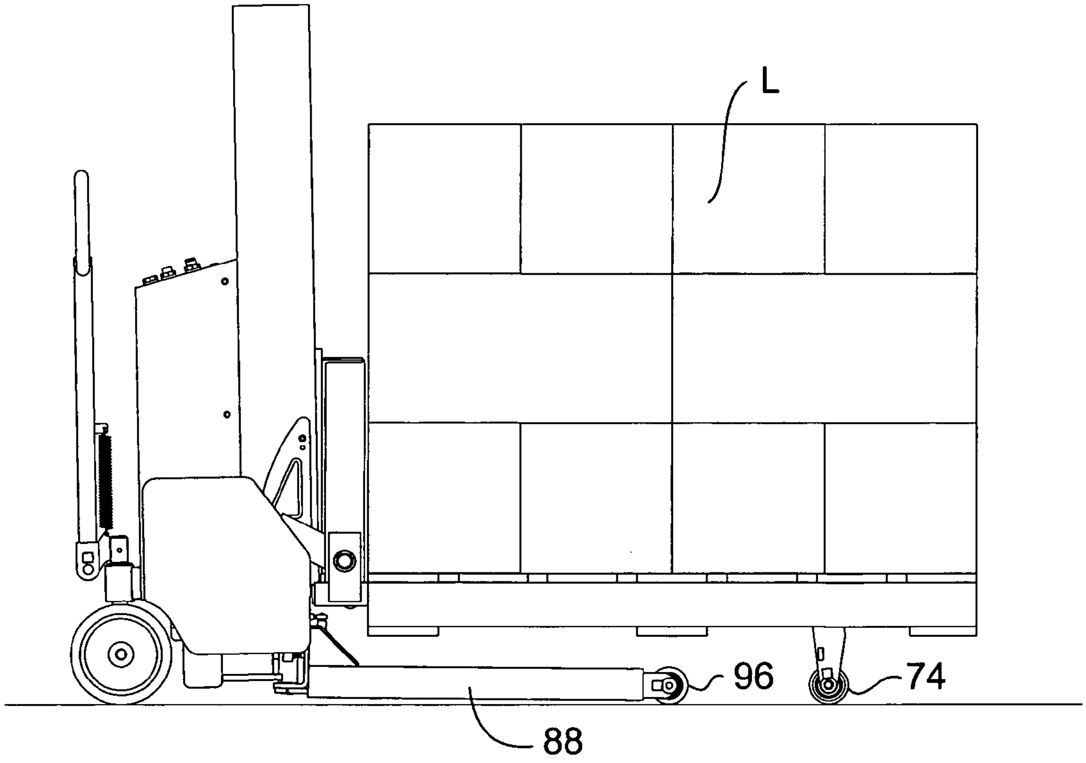
FIG. 17 shows the lift of the invention with a loaded pallet after the wheels of the outriggers begin to bear on the supporting surface.

Once the outriggers 88,90 are in their deployed positions, the carriage 52 begins to ascend once more. Because of the position of the drive 35 at the back side of the carriage, initially the carriage 52 and the rearward ends of the lifting members 64 begin to rise while the forward ends of the lifting members 64 remain at the same level. Consequently, the lifting members 64 lose their slight rearward tilt and become substantially horizontal. As the lifting members 64 return to a level orientation, the outriggers 88,90 tilt forward and the rolling elements 96 of the outriggers 88,90 come into contact with the underlying surface S, as shown in FIG. 17.

The rolling elements 74 of the lifting members 64 continue to bear against the underlying surface S while the lifting members 64 become horizontal. The rolling elements 74 are in still contact with the underlying surface S at the moment that the rolling elements 96 of the outriggers 88,90 come to rest on the underlying surface S.

As the carriage 52 continues to ascend after the rolling elements 96 of the outriggers 88,90 come into contact with the underlying surface S, the carriage 52 also raises the rolling elements 74 of the lifting members 64 from the surface S. The carriage 52 moves from its range of lowered positions to its range of raised positions when the rolling elements 74 of the lifting members 64 leave the underlying surface S.

Figure 18:
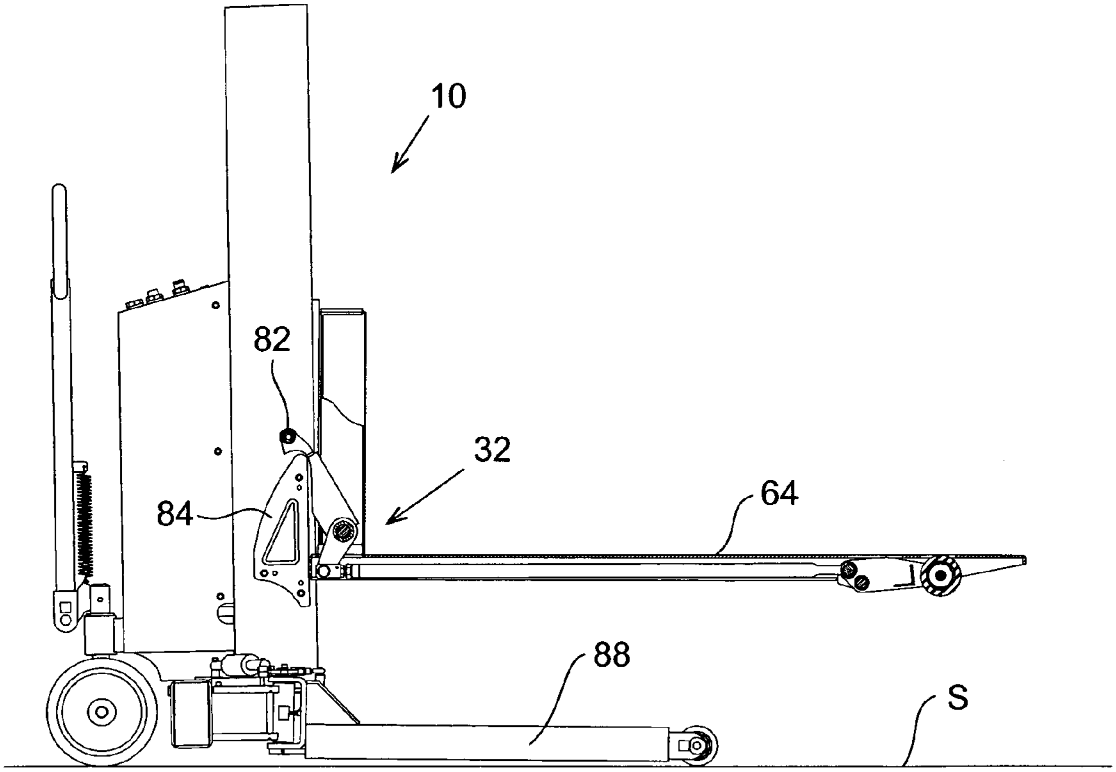
FIG. 18 illustrates the retracted position of the rolling assemblies in the forks of the carriage as the cam follower becomes disengaged from the cam during the upward motion of the carriage along the mast of the lift.

As the carriage 52 moves upward from the position illustrated in FIG. 14, the rolling elements 74 of the lifting members 64 lose contact with the underlying surface S and the cam follower 82 moves along the upper surface of the cam 84 until it moves out of engagement with the cam, as shown in FIG. 18. When the cam follower 82 becomes disengaged from the cam 84, the follower 82 no longer urges the rolling assemblies 70 of the lifting members 64 to their extended positions. As a result, the rolling assemblies 70 move to their retracted positions under the biasing action of the gas springs 71, as seen in FIGS. 18 and 19.

Figure 19:
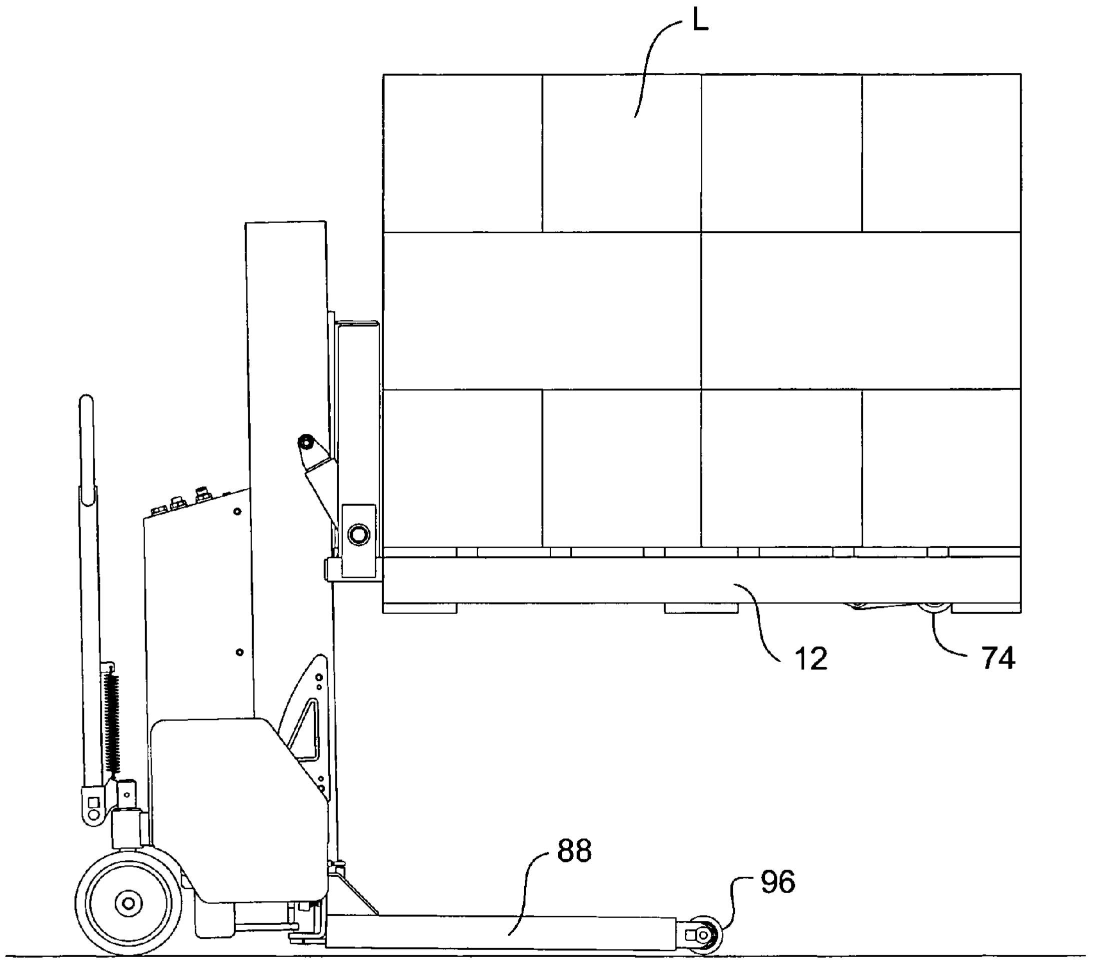
FIG. 19 shows the lift of the invention with a loaded pallet after it reaches a working height.

The range of raised positions of the carriage 52 includes an uppermost position (FIGS. 3 and 19). In the uppermost position of the carriage 52, as in most or all of the other raised positions, the cam follower 82 is free of contact with the cam 84 and the rolling assemblies 70 are retracted. The uppermost position of the carriage 52 is preferably such that the lifting members 64 are located at so-called “work height,” which would typically be about 30 inches above the underlying surface S.

With the carriage 52 in its range of raised positions, the operator of the lift 10 can wheel the lift 10 across the underlying surface S to a location of use or a storage location for the pallet 12 or skid 14.

To lower the carriage 52, the operator of the lift 10 actuates the down switch 104 on the console 100 thereby causing the carriage 52 to begin descending. When the carriage 52 nears its range of lowered positions, the cam follower 82 comes into engagement with the cam 84 and urges the rolling assemblies 70 of the lifting members 64 from their retracted positions to their extended positions against the action of the gas springs. The rolling elements 74 of the lifting members 64 come into contact with the underlying surface S shortly after the rolling assemblies 70 arrive at their extended positions.

When the rolling elements 74 of the lifting members 64 first contact the underlying surface S, reaching the same position seen in FIG. 17, the lifting members 64 are substantially horizontal. As the carriage 52 continues to descend following the initial contact between the rolling elements 74 and the underlying surface S, the rearward ends of the lifting members 64 continue to move slightly downward urged by a constant force spring 116 (see in FIG. 4A) acting on the carriage 52 while the forward ends of the lifting members 64 remain at the same level. Consequently, the carrier 30 tilts slightly backward on the rolling elements 40 while the lifting members 64 become downwardly inclined in a direction from the forward ends towards the rearward ends thereof. Due to the backward tilting motion of the carrier 30, the rolling elements 96 of the outriggers 88,90 are lifted off the underlying surface S.

After the rolling elements 96 of the outriggers 88,90 are clear of the underlying surface S, the downward motion of the carriage 52 is stopped by the same limit switch 114 that previously stopped the upward motion of the carriage 52. The outrigger 90 thereupon pivots from its deployed position to its stored position, as does the outrigger 88. The limit switches 89 (see FIGS. 6 and 7) detect the arrival of the outriggers 90 and 88 at their respective stored positions. There are four such limit switches that monitor the position of the outriggers (right outrigger in, right outrigger out, left outrigger in, and left outrigger out). The positions are monitored by the lift’s PLC.

Once the outriggers 88,90 are in their stored positions, the carriage 52 resumes its descent and the rolling assemblies 70 move from their extended positions to their retracted positions. The arrangement is such that, as the rolling assemblies 70 retract, the forward ends of the lifting members 64 move downward more rapidly than the carriage 52 and the rearward ends of the lifting members 64. Consequently, the carrier 30 loses its tilt and becomes level again while the lifting members 64 lose their inclinations and become horizontal.

The carriage 52 finally comes to rest once the rolling assemblies 70 are in their retracted positions and the carriage 52 is in its lowermost position. If a pallet or skid is supported on the lifting members 64 during the descent of the carriage 52, the pallet or skid comes to rest on the underlying surface S upon arrival of the carriage 52 at its lowermost position. The lifting members 64 can thereupon be withdrawn from the pallet or skid.

The limit switches that sense the arrival of the outriggers 88,90 in their deployed positions prevent the carriage 52 from moving when either or both of the outriggers 88,90 is not in the respective deployed position. Similarly, the limit switches that sense the arrival of the outriggers 88,90 in their stored positions prevent movement of the carriage 52 when one or both of the outriggers 88,90 is not in the respective stored position.

The programmable logic controller in the cabinet 98 at the rear of the mast 32 controls the deployment and storage of the outriggers 88,90 as well as the movement of the carriage 52.

The mode of operation just described relates to one embodiment of the lift 10. In an additional, not preferred, embodiment of the lift 10, which need not be described in detail since it includes the components of the embodiment outlined above, the carrier 30 does not tilt, and the lifting members 64 do not undergo a change in inclination during movement of the carriage 52 between its lowermost position and its uppermost position.

When the carriage 52 begins to move upward from its lowermost position in this additional embodiment of the lift 10, the cam follower 82 starts to track the cam 84 as before and urges the rolling assemblies 70 from their retracted positions to their extended positions. Upon arrival of the rolling assemblies 70 in their extended positions, the limit switch 114 for the carriage. 52 again causes the carriage 52 to stop. At this time, there is sufficient clearance between the lifting members 64 and the underlying surface S for the outriggers 88,90 to pivot underneath the lifting members 64 without interference.

After the carriage 52 comes to a stop, the outrigger 88 pivots from the stored position to the deployed position as does the outrigger 90. The arrival of the outriggers 88,90 at their respective deployed positions is sensed by the limit switches mentioned earlier. The outriggers 88,90 are clear of the underlying surface S during movement from the stored positions to the deployed positions and also upon arrival at the deployed positions.

Once the outriggers 88,90 are in their deployed positions, the outriggers 88,90 are displaced downward so that the rolling elements 96 of the outriggers 88,90 come into contact with the underlying surface S. Drives that are not shown in the drawings and are located primarily in the carrier 30 function to move the outriggers 88,90 downward.

After the rolling elements 96 of the outriggers 88,90 come to rest on the underlying surface S, the carriage 52 begins to ascend once more. As the carriage 52 travels towards its uppermost position, the cam follower 82 becomes disengaged from the cam 84 and the rolling assemblies 70 of the lifting members 64 move from their extended positions to their retracted positions under the biasing action of the gas springs.

Upon subsequent downward movement of the carriage 52, the cam follower 82 once again engages the cam 84 and urges the rolling assemblies 70 of the lifting members 64 from their retracted positions to their extended positions. The rolling elements 74 of the lifting members 64 come into contact with the underlying surface S shortly after arrival of the rolling assemblies 70 at their extended positions and the limit switch for the carriage 52 thereupon causes the carriage 52 to stop.

Once the carriage 52 has stopped descending, the outriggers 88,90 are shifted upward so that they are clear of the underlying surface S. The outrigger 90 then pivots from its deployed position to its stored position as does the outrigger 88. The limit switches referred to previously detect the arrival of the outriggers 88,90 at their respective stored positions.

Following the arrival of the outriggers 88,90 at their stored positions, downward movement of the carriage 52 resumes. The rolling assemblies 70 move from their extended positions to their retracted positions and the carriage 52 subsequently comes to rest in its lowermost position.

Both embodiments of the lift 10 operate as a stacker when the outriggers 88,90 deploy. By actuating the selector switch 106 on the console 100 behind the mast 32, the outriggers 88,90 can be prevented from deploying thereby allowing the lift 10 to operate as a pallet truck or jack.

The lift 10 of the invention combines the capabilities of prior art pallet trucks, prior art skid lifts and prior art stackers in a configuration that can be made highly maneuverable at a work site.

Various modifications are possible within the meaning and range of equivalence of the appended claims.

I claim:

1. A lift comprising:

a carrier with a vertical mast;

a carriage with a pair of forks projecting forward for engagement of a pallet or a skid, said carriage being movable up and down the vertical mast and each of said forks including a carriage rolling assembly movable between a retracted position and an extended position while the carriage is elevated within a range of lowered carriage positions, said carriage rolling assembly being in contact with an underlying surface as the carriage rolling assembly is moved between said retracted and extended positions;

a pair of outriggers attached to a support frame of the carrier, said outriggers being movable between a stored position and a deployed position; and a frame rolling assembly attached to the support frame for transporting the lift over said underlying surface;

wherein said outriggers are movable to said deployed position only when the carriage rolling assembly of each fork is substantially in said extended position; the outriggers do not bear on said underlying surface when in said stored position, or when in said deployed position while the carriage is operated within said range of lowered carriage positions; and the outriggers contact the underlying surface and begin supporting a front side of the lift only when the carriage moves up the vertical mast past said range of lowered carriage positions, when said carriage is at a transition point between said range of lowered carriage positions and a range of raised carriage positions.

2. The lift of claim 1, wherein said carriage rolling assembly of each fork is pivotally movable between said extended position and said retracted position as the carriage moves within said range of lowered carriage positions.

3. The lift of claim 2, wherein said carriage rolling assembly of each fork is pivotally movable between said extended position and said retracted position as a result of a cam affixed to the mast and a follower connected to the carriage.

4. The lift of claim 3, wherein said carriage rolling assembly of each fork is normally urged to the retracted position and is pushed to the extended position by a linkage mechanism driven by said follower.

5. The lift of claim 4, wherein said carriage rolling assembly of each fork is normally urged to the retracted position by a gas spring.

6. The lift of claim 1, further including a limit switch for stopping a movement of said carriage at said transition point.

7. The lift of claim 1, further including a handle attached to the frame rolling assembly for maneuvering the lift.

8. The lift of claim 1, further including a processor and a panel for manually controlling an operation of said carriage and said outriggers.

9. The lift of claim 1, wherein a front portion of each of said outriggers includes a wheel, and said wheel contacts the underlying surface as the carriage transitions from said range of lowered carriage positions to a range of raised carriage positions.

10. The lift of claim 1, wherein said carriage rolling assembly of each fork is pivotally movable as a result of a cam affixed to the mast and a follower connected to the carriage; and the carriage rolling assembly of each fork is urged to the retracted position by a gas spring and is pushed to the extended position by a linkage mechanism driven by said follower; and wherein the lift further includes a limit switch for stopping a movement of the carriage at the transition point between said range of lowered carriage positions and a range of raised carriage positions; a handle attached to the frame rolling assembly for maneuvering the lift; and a processor and a panel for manually controlling an operation of said carriage and said outriggers.

11. A lift comprising:

a carrier with a vertical mast;

a carriage with a pair of forks projecting forward for engagement of a pallet or a skid, said carriage being movable up and down the vertical mast and each of said forks including a carriage rolling assembly pivotally movable between a retracted position and an extended position while the carriage is elevated within a range of lowered carriage positions, said carriage rolling assembly being in contact with an underlying surface as the carriage rolling assembly is moved between said retracted and extended positions;

a limit switch for stopping a movement of the carriage at a transition point between said range of lowered carriage positions and a range of raised carriage positions;

a pair of outriggers attached to a support frame of the carrier, said outriggers being movable between a stored position and a deployed position;

a frame rolling assembly attached to the support frame for transporting the lift over said underlying surface;

a handle attached to the frame rolling assembly for maneuvering the lift; and a processor and a panel for manually controlling an operation of said carriage and said outriggers;

wherein the outriggers are movable to said deployed position only when the carriage rolling assembly of each fork is substantially in said extended position; the outriggers do not bear on said underlying surface when in said stored position, or when in said deployed position while the carriage is operated within said range of lowered carriage positions; and the outriggers contact the underlying surface and begin supporting a front side of the lift only when the carriage moves up the vertical mast past said range of lowered carriage positions, when said carriage is at a transition point between said range of lowered carriage positions and said range of raised carriage positions.

12. A method of operating a lift comprising the following steps providing a lift that includes a carrier with a vertical mast; a carriage with a pair of forks projecting forward for engagement of a pallet or a skid, said carriage being movable up and down the vertical mast and each of said forks including a carriage rolling assembly movable between a retracted position and an extended position while the carriage is elevated within a range of lowered carriage positions, said carriage rolling assembly being in contact with an underlying surface as the carriage rolling assembly is moved between said retracted and extended positions; a pair of outriggers attached to a support frame of the carrier, said outriggers being movable between a stored position and a deployed position; and a frame rolling assembly attached to the support frame for transporting the lift over said underlying surface; wherein said outriggers are movable to said deployed position only when the carriage rolling assembly of each fork is substantially in said extended position; the outriggers do not bear on said underlying surface when in said stored position, or when in said deployed position while the carriage is operated within said range of lowered carriage positions; and the outriggers contact the underlying surface and begin supporting a front side of the lift only when the carriage moves up the vertical mast past said range of lowered carriage positions, at a transition point between said range of lowered carriage positions and said range of raised carriage positions;

moving the lift to engage a pallet or a skid while the carriage is at a lowermost position along the vertical mast;

raising the carriage to a transition point between said transition point;

deploying the outriggers from said stored position to said deployed position; and further raising the carriage to a work height within said range of raised carriage positions.

13. The method of claim 12, wherein said carriage rolling assembly of each fork is pivotally movable as a result of a cam affixed to the mast and a follower connected to the carriage; and the carriage rolling assembly of each fork contacts the underlying surface when the carriage is within said range of lower carriage positions and no longer contacts the underlying surface when the carriage is within the range of raised carriage positions.

14. The method of claim 13, wherein said carriage rolling assembly of each fork is urged to the retracted position and is pushed to the extended position by a linkage mechanism driven by said follower.

15. The method of claim 14, wherein said carriage rolling assembly of each fork is urged to the retracted position by a gas spring.

16. The method of claim 12, wherein a limit switch is provided in the lift for stopping a movement of said carriage at said transition point between the range of lowered carriage positions and the range of raised carriage positions.

17. The method of claim 12, wherein a front portion of each of said outriggers includes a wheel, and said wheel contacts the underlying surface as the carriage transitions from said range of lowered carriage positions to said range of raised carriage positions; and the method further includes the step of maneuvering the lift at a work site.

* * * * *

UNITED STATES PATENT AND TRADEMARK OFFICE

CERTIFICATE OF CORRECTION

PATENT NO. : 8,376,089 B2
APPLICATION NO. : 12/002135
DATED : February 19, 2013
INVENTOR(S) : Robert M. Stone It is certified that error appears in the above-identified patent and that said Letters Patent is hereby corrected as shown below:

In the Claims:

In Claim 12, Col. 14, lines 22-23, replace "a transition point between said transition point" with --said transition point--.

Signed and Sealed this
Twenty-third Day of April, 2013

Teresa Stanek Rea
*Acting Director of the United States Patent and Trademark Office*